Figure 15:
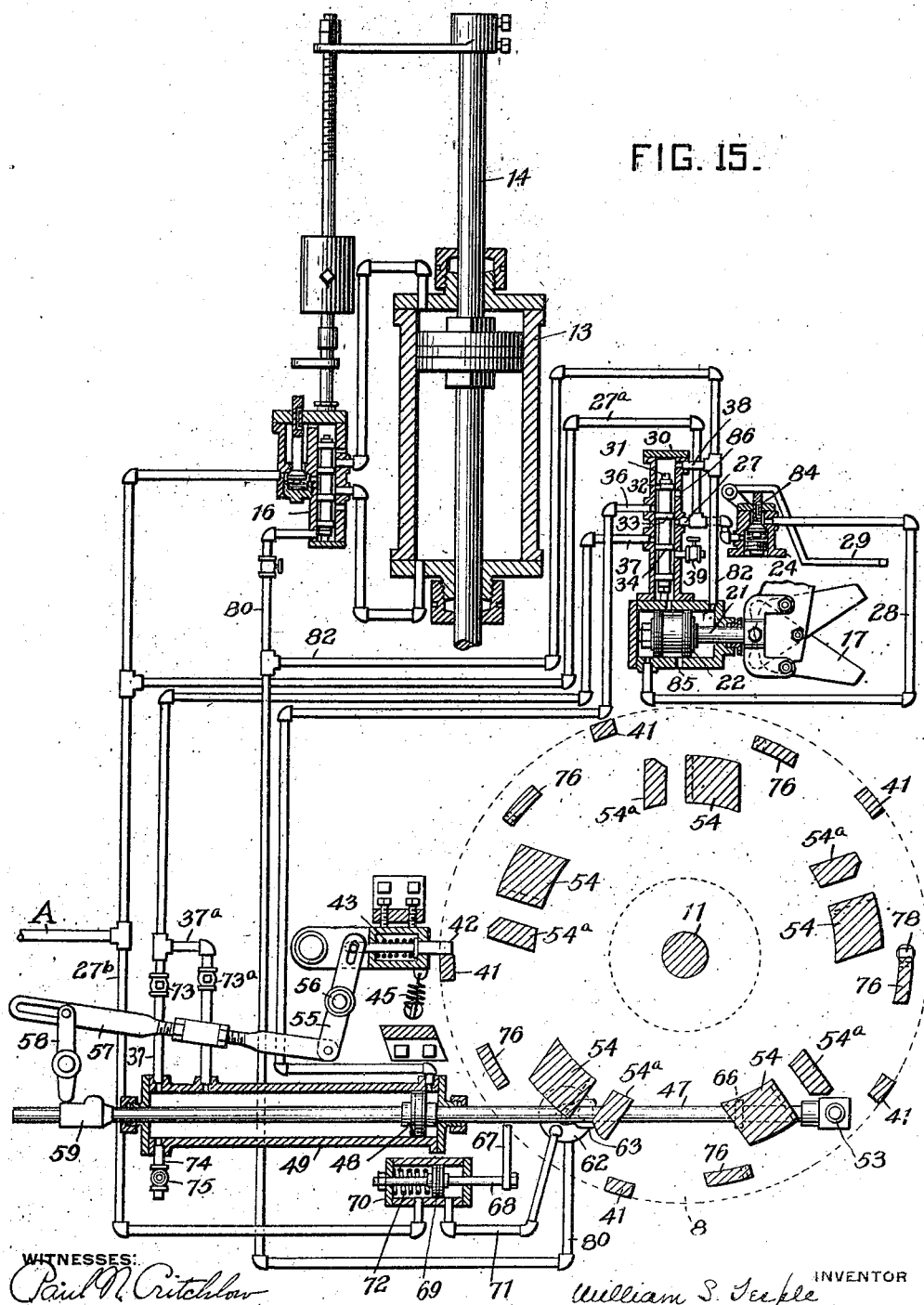

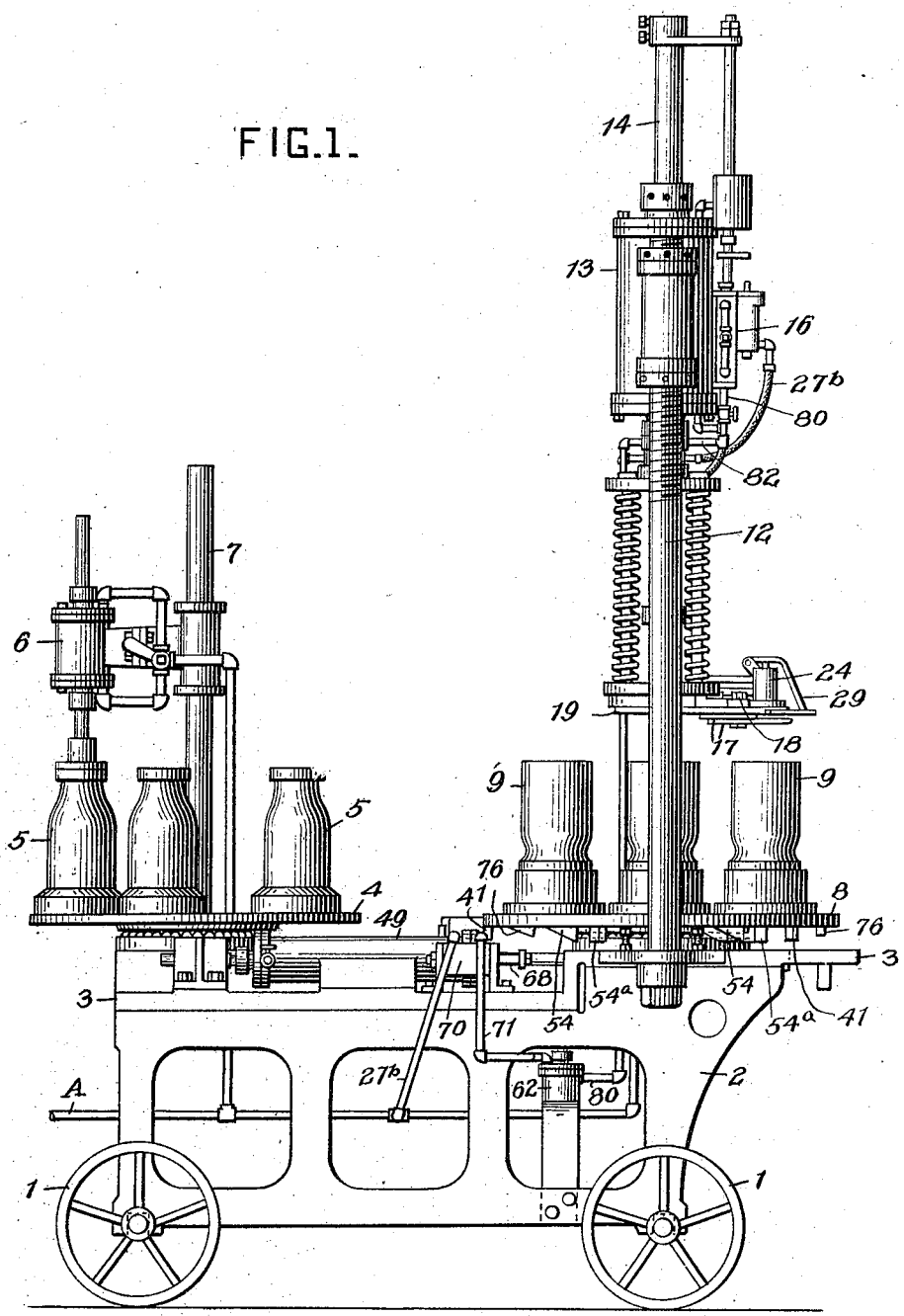

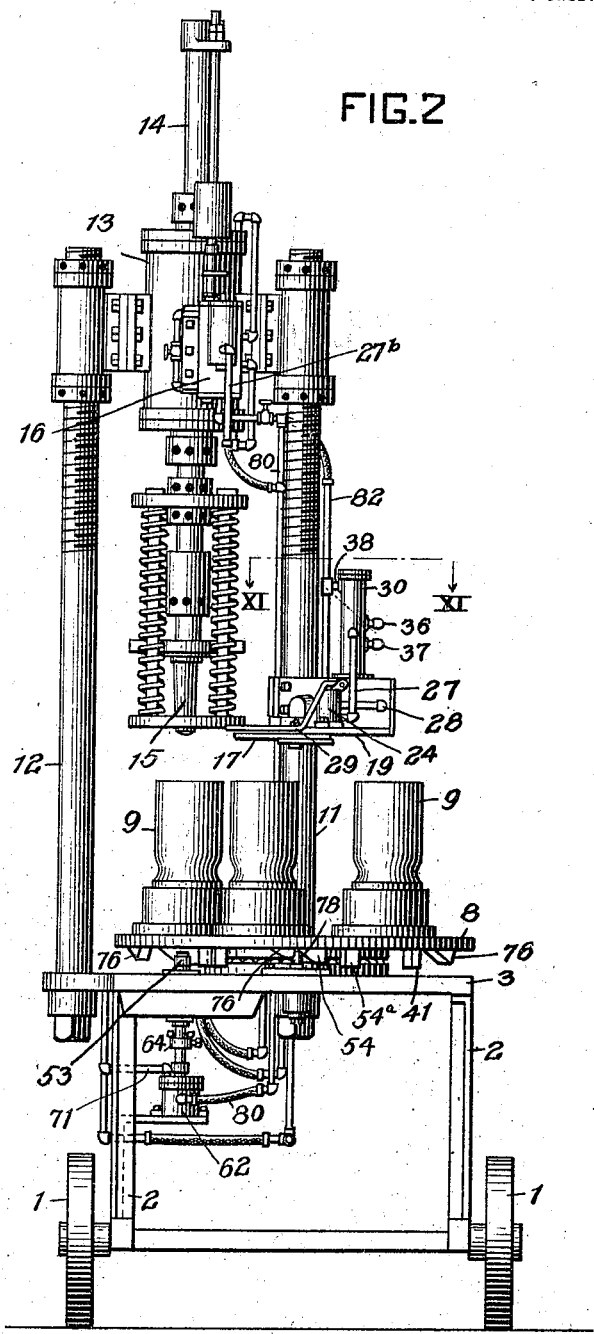

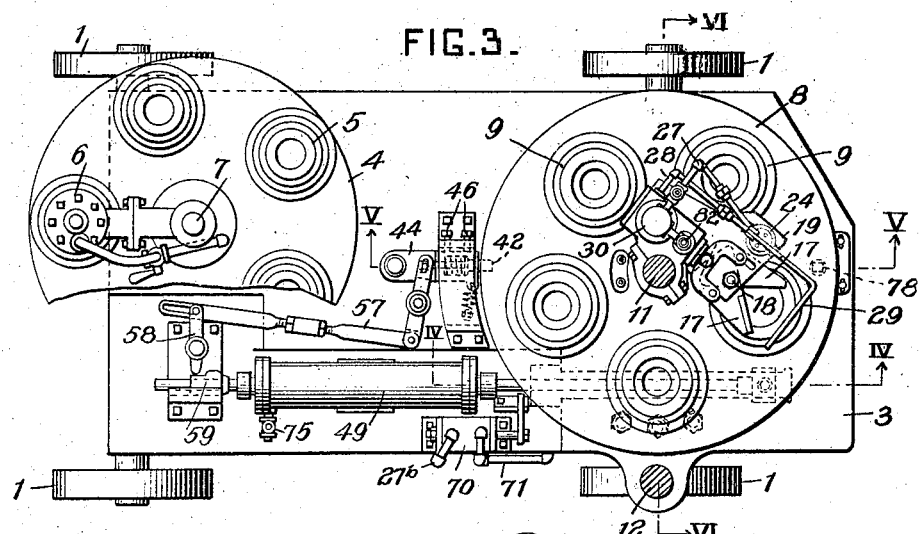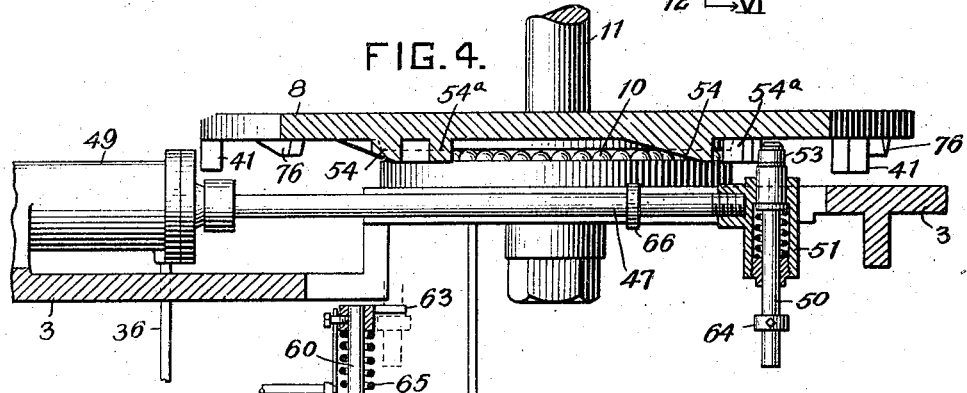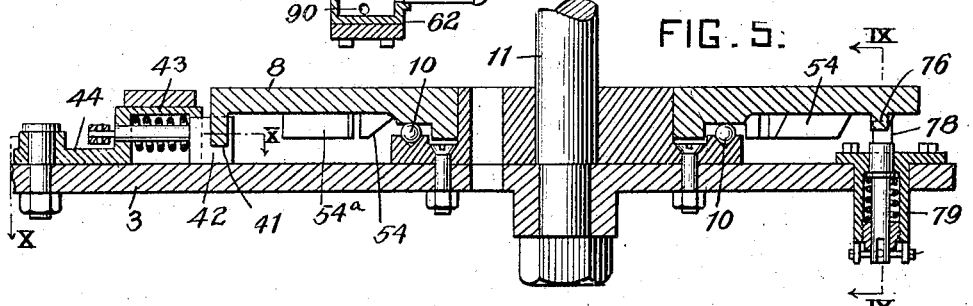

W. S. TEEPLE.
GLASS WORKING MACHINE.
APPLICATION FILED FEB. 2, 1914.
1,154,895.
Patented Sept. 28, 1915.
6 SHEETS—SHEET 4.
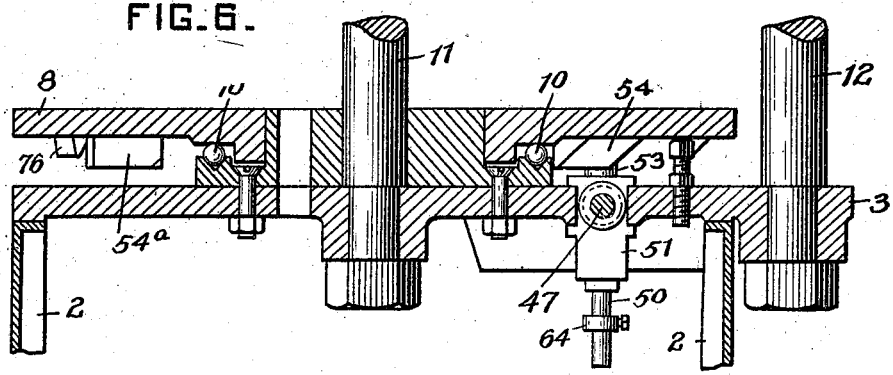
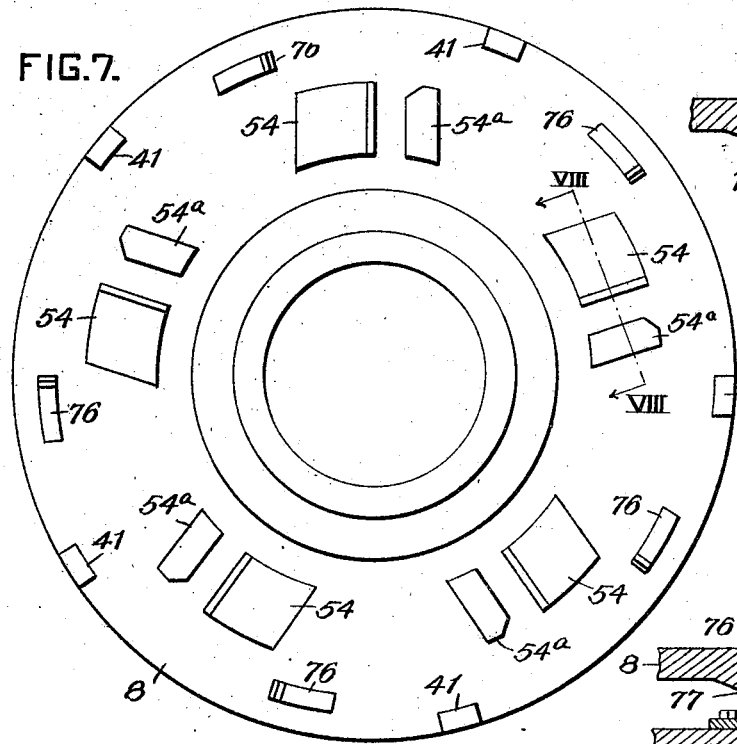
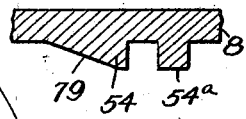
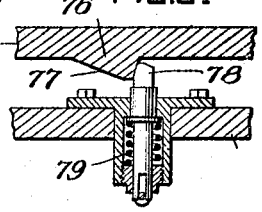
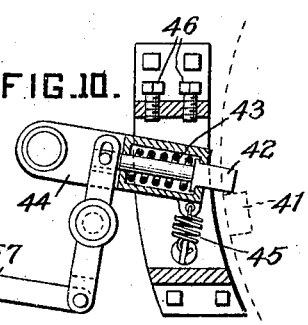
WITNESSES:
Paul N. Crutchlow
Francis J. Tomasson
INVENTOR
William S. Teeple
by Christy and Christy
Atty's W. S. TEEPLE.
GLASS WORKING MACHINE.
APPLICATION FILED FEB. 2, 1914.
1,154,895.
Patented Sept. 28, 1915.
6 SHEETS—SHEET 5.
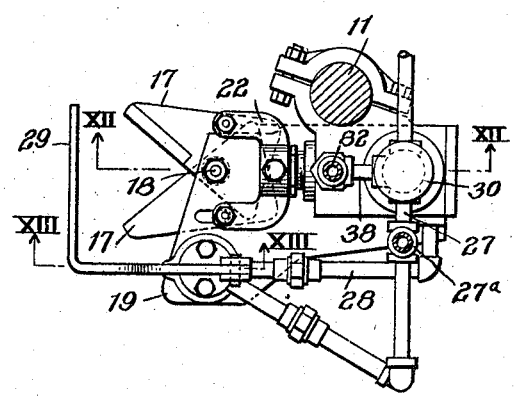
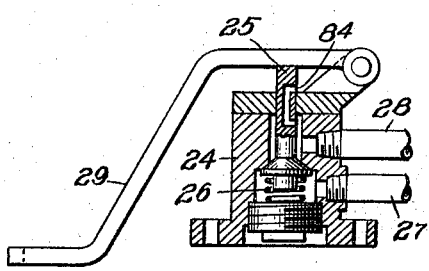
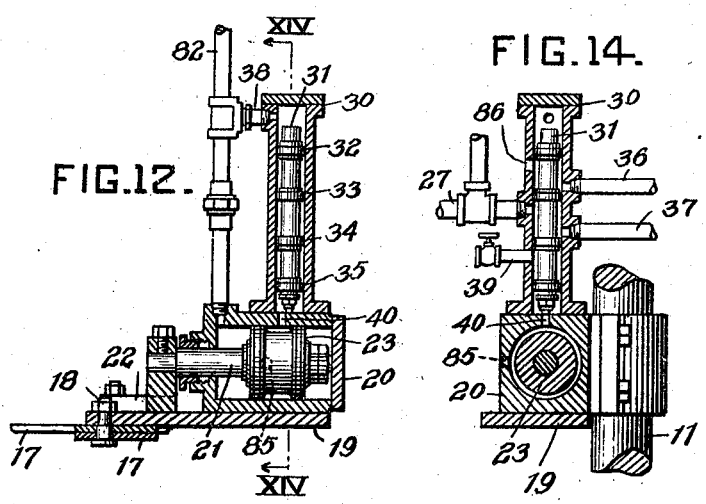
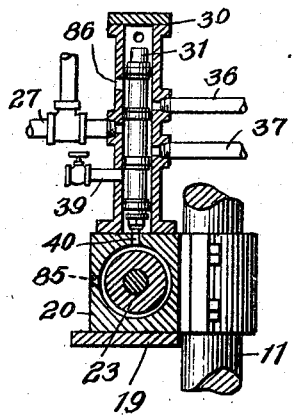
WITNESSES:
INVENTOR
William S. Teeple
by Christy and Christy
Att'ys

W. S. TEEPLE.
GLASS WORKING MACHINE.
APPLICATION FILED FEB. 2, 1914.

1,154,895.

Patented Sept. 28, 1915.
6 SHEETS—SHEET 6.

WITNESSES:

INVENTOR
William S. Teeple
by Christy and Christy
Atty's

UNITED STATES PATENT OFFICE.

WILLIAM S. TEEPLE, OF WELLSBURG, WEST VIRGINIA.

GLASS-WORKING MACHINE.

1,154,895.

Specification of Letters Patent. Patented Sept. 28, 1915.

Original application filed November 10, 1913, Serial No. 799,724. Divided and this application filed February 2, 1914. Serial No. 815,995.

*To all whom it may concern:*

Be it known that I, WILLIAM S. TEEPLE, residing at Wellsburg, in the county of Brooks and State of West Virginia, a citizen of the United States, have invented or discovered certain new and useful Improvements in Glass-Working Machines, of which improvements the following is a specification.

My invention relates to machines of the character illustrated and described in my pending application, Serial No. 799,724, filed Nov. 10, 1913, and the object of my invention is to simplify the general construction and operation of such machines, and particularly of the machine shown in said application.

A more specific object of my invention is to reduce to a minimum the number of valves and movable elements of these machines, effecting with less mechanism all the functions of the more complicated machines.

As in my pending application, I show again a machine for pressing glass blanks adapted to be subsequently blown into bottles, the blowing table being illustrated but forming no part of my present invention. It will be apparent, however, that my invention may readily be embodied in machines for shaping glass other than those intended to form mold blanks.

In the accompanying sheets of drawings, illustrating my invention, and forming part of my specification, Figure 1 is a side elevation of the complete machine; Figs. 2 and 3 are right end elevation and plan view, respectively, of the machine illustrated in Fig. 1; Figs. 4, 5 and 6 sectional views taken, respectively, on the lines IV—IV, V—V, and VI—VI, Fig. 3; Fig. 7 is a bottom plan view of the revolving table; Fig. 8 a detail sectional view taken on the line VIII—VIII, Fig. 7; Figs. 9 and 10 are detail sectional views taken, respectively, on the line IX—IX and X—X, Fig. 5; Fig. 11 is a plan view to enlarged scale of the shears and their operating mechanism, the plane of view being indicated by the line XI—XI, Fig. 2; Figs. 12 and 13 are sectional views taken, respectively, on the lines XII—XII, and XIII—XIII. Fig. 11; Fig. 14 is a sectional view taken on the line XIV—XIV, Fig. 12; and Fig. 15 is a diagrammatic representation of all the parts and pipe connections essential to the operation of the machine, the valves and operating parts being shown in section where it is necessary for their complete understanding.

In the several figures like numerals are used to designate like parts.

The motive power for substantially all the movable parts of the machine is fluid pressure, applied either directly or indirectly to such parts. Since compressed air is required for blowing the glass articles, it, rather than steam or other pressure fluid, may be economically and advantageously used for operating the machine.

The several operating parts of the machine may be conveniently classed under three heads, first, those having to do with the shears; second, the movement of the table; and third, the operation of the plunger. As the plunger operating mechanism shown herein is the same as that illustrated and described in my pending application, it will be necessary to describe in detail only the shear and table-moving mechanism, and this will be done in the order named after first describing the general construction of the machine.

The complete machine is suitably mounted on a truck comprising wheels 1, side frames 2 and platform 3. At the left end of the platform, as seen in Fig. 1, a rotatable blowing table 4, provided with molds 5, is mounted; and a blower 6 is secured to a central rod 7 in position to register with the molds 5 as they are successively brought beneath it. As stated heretofore, my improvements are not illustrated as applied to the blowing table, so that further description of it is unnecessary. At the right end of the platform 3 the mold table 8, provided with molds 9, is rotatably mounted, the table being sustained directly by ball bearings 10, as seen in Figs. 4 and 5.

A rod 11 extends through the center of the mold table 8, and a rod 12 is at the side thereof, both rods being attached to the platform 3 and sustaining at their outer end the plunger and its operating mechanism. The essential parts of the plunger mechanism comprise a cylinder 13, plunger rod 14 having a former 15 at its lower end, and timing valve 16, it being understood that the rod 14 is caused to reciprocate through the cylinder 13, the former 15 entering successively each mold 9 and shaping the molten glass previously placed therein. The shears 17 and their operating mechanism are rigidly connected into a single structure which is clamped to the rod 11 above the general plane of the tops of the molds 9.

Such is the general structural arrangement of the machine. In its general operation a quantity of molten glass is fed to such mold 9 as is then immediately beneath the shears 17, which are caused, by letting live air to their operating mechanism, to cut from the gathering tool a quantity of the glass, which then drops into the mold. The operation of the shears controls the further flow of compressed air to the end that the mold table is advanced one station (that is, the angular distance between adjacent molds) so that the filled mold stands beneath the plunger and thereafter the plunger rod 14 is moved downwardly, its former 15 shaping the glass within the mold.

Referring now to the shears, their construction, as well as that of their operating mechanism, is best illustrated in Figs. 11, 12, 13, 14 and 15. The shear blades, which are rigid and therefore capable of withstanding the conditions of service, are pivoted by a pin 18 to a plate 19, which is secured to a cylinder casing 20. A piston rod 21 extends through one end of the cylinder 20 and at its outer end is attached to a forked member 22, the ends of which are pivotally connected one to each outer side of the blades 17. The inner end of the rod 21 is provided with a piston head 23, means being provided to cause air to act on opposite sides thereof to open and close the shears, as will be presently described.

Normally, the shears and their moving mechanism are in the positions indicated in the drawings, being thus ready to cut a quantity of glass from the gathering tool. To cause the shears to operate, I provide a single valve comprising a casing 24 having a valve seat therein, and a movable stem 25 provided with a valve plug held yieldingly in closed valve position by means of a spring 26, the casing, on opposite sides of the valve seat, being connected to the live air supply A by pipes 27, 27ª and 27ᵇ, and to the rear end of the cylinder 20 by pipe 28. The stem 25 may be lowered to permit air to flow to the cylinder 20 by means of a lever 29, pivoted to the upper portion of the casing 24, and bearing upon the outer end of the valve stem 25, the arrangement being such that the lever 29 may be lowered by the punty in the hands of the gatherer after a sufficient amount of glass has flowed from it. The table-turning mechanism is also operated by air which is let thereto after the shears have cut the glass. For this purpose a compound plunger valve is used, it preferably being secured to the top of the shear cylinder 20, and comprising a casing 30 and a two-position valve rod 31, provided with four collars 32, 33, 34 and 35, the rod always being in its lowermost position immediately preceding each operation of the shears. The lower part of the casing 30 communicates through port 40 with the cylinder 20. As will best be seen in Fig. 15, this casing has leading from it pipes 36, 37 and 38, and a valve-controlled outlet 39, the purpose of which will appear hereinafter. When the rear of the shear piston head 23, nears the end of its stroke, it uncovers the port 40, permitting live air to act against and raise the rod 31; and, in such upper position of the rod, live air flows from the supply A through pipes 27ᵇ, 27ª, 27, cylinder 30 between the collars 33 and 34, and pipe 36 to the table-moving means which are thus set in motion. The exhaust from the cylinder 20 and the upper end of the casing 30 escapes through pipes 38, 82 and 80 to a cylinder 62 provided with a free outlet port 90.

Referring now to the table-turning mechanism, it may be best seen in Figs. 1 and 10 inclusive and 15. As is usual in machines of this character, the table is locked after each intermittent advance of one station. The complete table-moving mechanism therefore comprises means for unlocking the table and means for moving it. In order to lock the table, a series of detents 41, corresponding in number to the intended stations in a full revolution of the table, are formed on its lower face, preferably protruding therefrom, such detents being adapted to be engaged by means of a movable finger 42, held yieldingly in detent-engaging position by means of a spring 43. The finger 42 is mounted in a casing 44, pivoted at its outer end to the platform 3, and held yieldingly by a spring 45, toward the advance of each approaching detent 41. Adjustable set screws 46 limit the movement of the finger casing 44 in the direction of rotation of the table 8, the arrangement of these several locking parts being such that, when a detent 41 strikes the finger 42, the movement of the table will be retarded under the action of the spring 45, and will be finally stopped at its exact intended position when the casing 44 strikes the screws 46.

Such being the table locking means, its movement is effected by means of a piston rod 47 provided with a head 48 movable through a fixed cylinder 49, the outer end of the rod 47 being provided with a table-engaging pin 50, held yieldingly in upward position by a spring 51. The pin 50 has a roller 53 at its upper end which is adapted to engage one of a second series of detents 54 formed on the lower face of the table 8, there being guards 54ª at the rear of each detent 54 adapted to prevent the table from turning more rapidly than the rod is moved, particularly at the end of its stroke.

The unlocking of the table is effected by the initial movement of the rod 47. To such end a lever 55 is pivoted to the platform 3, as at 56, and is connected at one end to the finger 42 and at the other end to a lengthwise adjustable rod 57, which has slotted engagement with one end of a second pivoted lever 58. One arm of said second pivoted lever extends within the range of engagement of an abutment 59 borne by the piston rod 47, and is adapted to be tripped thereby during the initial movement of the rod, it being observed from Fig. 15 that the roller 53 of locking pin 50 must advance a short distance before it comes in engagement with a detent 54. The tripping of the lever 58 by the abutment 59 in the initial movement of the piston rod 47 becomes effective, through rod 57, and lever 55, to withdraw the finger 42 and hence unlock the table, the further movement of the rod 47 causing the table to advance one station.

Means, effective just after the table has advanced a station, are provided for releasing the pin 50 from its engagement between the detents 54 and 54ª. Such means (see Fig. 4) preferably comprise a rod 60, provided at one end with a piston-head 61 movable through a cylinder 62, and at its other end with a fork 63, adapted to receive the pin 50 at a point above a collar 64 secured to said pin. The rod 60 is held yieldingly in upward position by means of a spring 65, and may be lowered against the action of the spring by letting air through pipe 71 into the cylinder 62 at the upper side of the piston 61. For this purpose a second abutment 66 is secured to the table-moving piston rod 47 in such position as to engage a finger 67 secured to a valve rod 68, as seen in Fig. 15. The rod 68 is provided with a head 69 movable within a casing 70, connected to pipes 27ᵇ and 71, and is held normally in its indicated position by means of a spring 72. When (near the end of the stroke of the rod 47) the abutment 66 strikes the finger 67, the head 69 is moved through the casing 70 so that air flows from the supply A through pipe 27ᵇ, casing 70, and pipe 71 to the cylinder 62; and, acting on the head 61, such air moves the releasing rod 60 downwardly, the rod carrying with it the pin 50, it then being in the position indicated in dotted lines in Fig. 4.

In order to regulate the rate of movement of the table-moving rod 47 throughout its entire range of travel, and thus prevent hammering by a too rapid movement thereof, means are provided for regulating the flow of exhaust air from the cylinder 49. A pipe 37, provided with a check valve 73, leads from the end of the cylinder 49 to the valve casing 30, the check valve permitting flow only toward the cylinder 49, and a second pipe or by-pass 37ª, provided with a check valve 73ª leads from said cylinder at a point more remote from its end than the pipe 37 and is connected to such pipe beyond the valve 73. The check valve 73ª permits flow only from the cylinder 49. A third pipe 74, provided with an adjustable valve 75, leads from the end of the cylinder 49. With this arrangement of pipes and valves, it will be seen that, as the piston head 48 moves to the left, as shown in Fig. 15, the exhaust air will have two escape passages, one being through the pipes 37ª and 37, valve casing 30 between the collars 34 and 35 and valve outlet 39, and the other being through the valve-controlled pipe 74. The valve of the outlet 39 may be regulated to effect desired variations in the rate of movement of the rod 47 throughout the major portion of its travel, it being understood that such outlet is cut off by the head 48 when it reaches the inlet end of the pipe 37ª, and the valve 75 may be regulated to effect the proper cushioning, without hammering, of the end of the stroke. Such regulating means have been found to be of very considerable importance to the successful operation of the machine.

In addition to locking, by finger 42, the table 8 against further advance in the direction of its rotation, means are also provided to lock the table at each station against turning in the opposite direction. For such purpose the lower face of the table 8 is provided with still another series of detents 76 having sloping faces 77 (see Fig. 9), and a pin 78, held yieldingly in upward position by a spring 79, is mounted in the platform 3, the arrangement being such that, as the table turns in its normal direction, the pin 78 will be lowered by the sloping face 77 of the detent 76 and will fly back of such detent just as the table is stopped at its exact position. Thus it will be seen that the table is held at each station between the finger 42 and pin 78 against rotation in either direction.

While, as shown in the drawings and as described above, the table 3 is provided with a guard 54ª at the rear of each detent 54, and releasing means are employed for disengaging the pin 50 from between the detents 54 and 54ª, it is readily apparent that the normal operation of the machine will not be seriously impaired by the elimination of such elements. When the machine is thus construc ed the detent 54 may have sloping faces 79, as shown in Figs. 4 and 8. There being then no obstacle in the path of the return stroke of the piston rod pin 50 in the return stroke of the piston rod 47, such pin will move freely over the face of the table, and will be depressed by the sloping face 79 of the next detent 54, flying to the rear thereof at the end of the stroke.

The final step in the operation of the machine, as far as my present invention is concerned, consists of opening the shears 17 and effecting the return stroke of the piston rod 47. To such end a pipe 80 leads from the cylinder 62, near the top thereof and extends to the timing valve 16. A branch 82 of said pipe 80 extends to the shear cylinder 20, and, by pipe 38, to the valve casing 30. It will be seen that, by such construction, when the piston head 61 is lowered, live air will flow from the source of supply A through pipe 27ᵇ, cylinder 70, pipe 71, cylinder 62, pipe 80 directly to the timing valve 16, and through pipe 82, leading from pipe 80, to the shear cylinder 20, and also through pipe 38, leading from pipe 82, to the valve casing 30. By means of the live air, thus led to these several parts, the timing valve 81 will operate as illustrated and described in my heretofore mentioned pending application: the shear piston head 22 will move to open the shears, the exhaust air at the rear thereof escaping through pipe 28 and a by-pass 84 in the stem 25 of the starting valve; and the valve rod 31 will be moved downwardly, the exhaust air at the bottom thereof escaping through port 40 and through a port 85 in the cylinder 20. The valve rod 31 being thus moved to the position shown in the drawings, live air will flow from the source of supply A through pipe 27ᵇ, 27ª, casing 30 between collars 33 and 34, pipe 37 and check valve 73 to the cylinder 49, causing the piston head 48 to move to the position indicated. In this movement of the head 48, the exhaust air escapes from the cylinder 49 through pipe 36, casing 30 between the collars 32 and 33, and port 86 in such casing.

The complete operation of the machine, omitting for the most part the enumeration of the pipes through which air is caused to flow, is as follows: The gatherer, after a sufficient quantity of molten glass has flowed from his punty, depresses the lever 29 by his punty, thus causing air to flow through the valve 24, 25 to the shear cylinder 20, which air moves the piston head 22 to operate the shears 17. As the head 22 moves forward it uncovers the port 40 of cylinder 20 leading to the valve casing 30 so that air enters such casing and moves the valve stem 31 upwardly through it. Live air then passes through the casing 60 and pipe 36 to the cylinder 49 causing the head 48 to move through it. The initial movement of the rod 47 releases the locking finger 42, and its continued movement causes the table 8 to advance one station. During the turning of the table it is engaged by the roller 53 of pin 50, which then lies in a slot formed between a pair of detents 54 and 54ª, the complete movement of the table being regulated by controlling the escape of exhaust air from the cylinder 49.

As the rod 47 nears the end of its stroke, the abutment 66, through finger 67 and rod 68, moves the valve 69 so that air flows to the cylinder 62 causing the piston head 61 to move downwardly and release the pin 50 from its engagement with the table. When the piston head 61 is in its lowered position live air flows through the cylinder 62 by pipe 80 to the timing valve 16, and by pipe 82 (a branch of pipe 80) to the shear cylinder 20 and valve casing 30, thus causing the shears to open and the valve rod 31 to move to its lower position. The operation of the timing valve 16, as described in my pending application completes the full cycle of operation of the machine.

I claim as my invention:

1. In a glass-forming machine, the combination of a rotatable table, means including a fluid pressure cylinder and a reciprocatory piston therein for rotating said table intermittently, a glass cutter, means including a fluid pressure cylinder for operating said cutter, a starting valve for controlling the flow of pressure fluid to said cutter cylinder, a compound valve comprising a casing and a two-position longitudinally-movable plunger, conduits leading from opposite ends of said table-moving cylinder to said valve casing, said plunger valve in its opposite positions placing said conduits alternately in communication with a source of fluid supply and with an exhaust passageway, and means whereby the movement of said plunger is controlled by the movement of said glass cutter.

2. In a glass-forming machine, the combination of a rotatable table, means including a fluid pressure cylinder for rotating said table intermittently, a glass cutter, means including a fluid pressure cylinder for operating said cutter, a starting valve controlling the flow of pressure fluid to said cutter cylinder, a compound valve comprising a casing and a two-position plunger movable by pressure fluid, said compound valve controlling the flow of pressure fluid to and from said table moving cylinder, and a pressure fluid passageway between said casing and said cutter cylinder, whereby the pressure fluid let to the cutter cylinder moves said plunger after the cutter is set in operation.

3. In a glass-forming machine, the combination of a rotatable table, means including a fluid pressure cylinder and a reciprocatory piston therein for rotating said table intermittently, shears for cutting molten glass, means including a fluid pressure cylinder and a reciprocatory piston therein for operating said shears, a starting valve for controlling the flow of pressure fluid to said shear-operating cylinder, a compound pressure-controlling member comprising a casing and a two-position valve therein, conduits leading from opposite ends of said table-moving cylinder to said valve casing, said valve in its opposite positions, placing said conduits alternately in communication with a source of fluid supply and with an exhaust passageway, and means whereby the movement of said valve is controlled by the movement of said shears.

4. In a glass-forming machine, the combination of a rotatable table provided with a plurality of latch-engaging detents, a movable latch for engaging said detents and thereby locking said table, a reciprocatory rod for turning said table, a plurality of rod-engaging detents secured to said table, said rod in its inactive stroke moving to a stationary position beyond the range of engagement with the next detent engageable thereby, and a latch-releaser operable by the movement of said rod while advancing from said stationary position into engagement with the rod-engaging detent beyond which it moved on its preceding return stroke.

5. In a glass-forming machine, the combination of a rotatable table provided with a plurality of latch-engaging detents, a movable latch for engaging said detents and thereby locking said table, a reciprocatory rod for turning said table, a plurality of rod-engaging detents secured to said table, a plurality of rod-guarding detents secured to the table and disposed one adjacent to each of said rod-engaging detents, said rod in its inactive stroke moving to a stationary position beyond the range of engagement with the next detent engageable thereby, and a latch-releaser operable by the movement of said rod while advancing from said stationary position into engagement with the rod-engaging detent beyond which it moved on its preceding return stroke.

6. In a glass-forming machine, the combination of a rotatable table provided with a plurality of lock-engaging detents, a reciprocatory pivotally mounted latch held yieldingly against the advance of said detents, a reciprocatory rod for turning said table, a plurality of rod engaging detents attached to said table, said rod in its inactive return stroke moving to a stationary position beyond the range of engagement with the next detent engageable thereby, and a latch releaser operable by the movement of said rod while advancing from said stationary position into engagement with the table-turning detent beyond which it moved on its preceding return stroke.

In testimony whereof I have hereunto set my hand.

WM. S. TEEPLE.

Witnesses:
E. E. CARTER,
C. K. JACOB.